I. RENNERFELT.
METHOD OF GENERATING HEAT BY MEANS OF ELECTRIC ARCS.
APPLICATION FILED MAR. 18, 1913.
1,103,379.
Patented July 14, 1914.
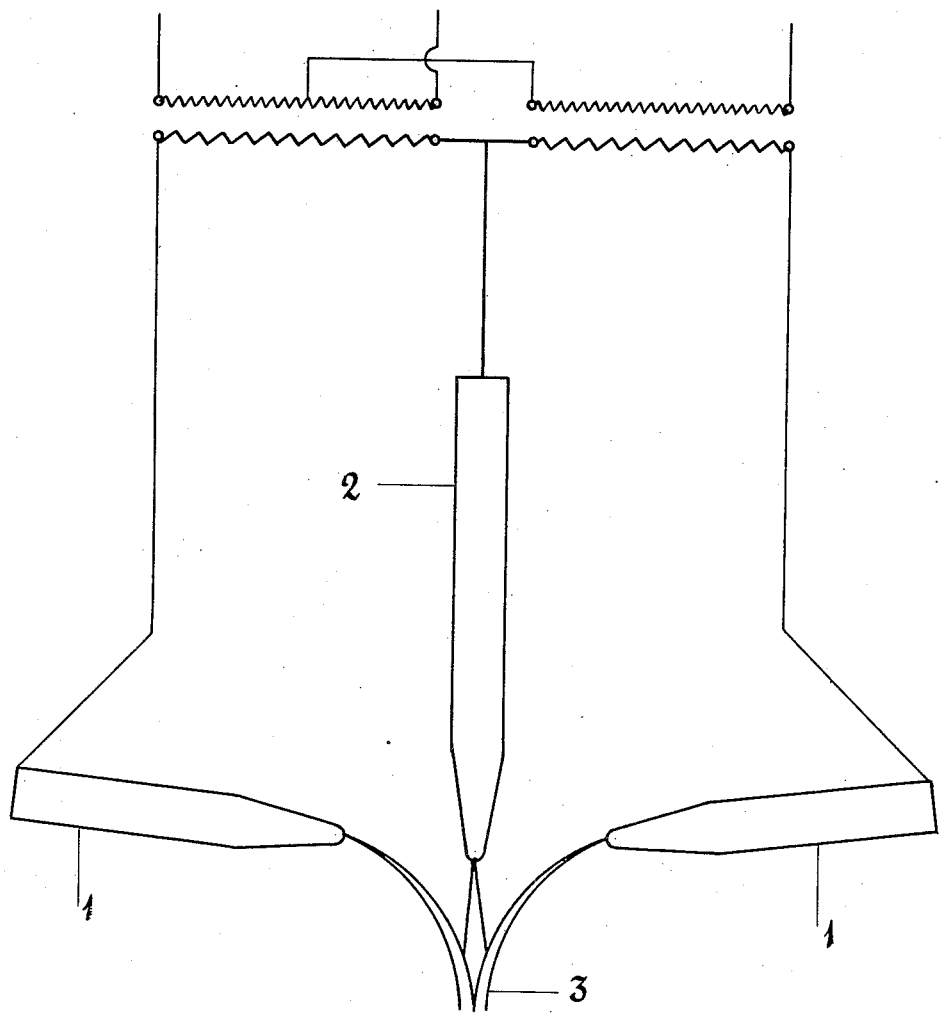

UNITED STATES PATENT OFFICE.

IVAR RENNERFELT, OF STOCKHOLM, SWEDEN.

METHOD OF GENERATING HEAT BY MEANS OF ELECTRIC ARCS.

1,103,379. Specification of Letters Patent. Patented July 14, 1914.

Application filed March 18, 1913. Serial No. 755,194.

*To all whom it may concern:*

Be it known that I, IVAR RENNERFELT, a citizen of the Kingdom of Sweden, residing at Stockholm, Sweden, have invented a new and useful Method of Generating Heat by Means of Electric Arcs, of which the following is a specification.

This invention relates to the method of converting energy into heat by means of electric arcs burning between the ends of a plurality of electrodes and has for its object to facilitate the employment of said method in connection with electric furnaces and for other similar purposes.

According to my invention a plurality of electrodes are arranged in a plane or nearly in a plane and opposing each other. Symmetrically between and at right angle to these electrodes another electrode is located in such a way that arcs may be caused to burn between this electrode and the other electrodes by connecting the electrode to a suitable source of power and making contacts between the ends of the electrodes. It has been found that arcs obtained by this method of arranging the electrodes are strongly deviated away from the system of electrodes in a manner most advantageous to the process of melting or heating materials in an electric furnace. For practical purposes it is desirable to locate the horizontal electrodes in a furnace well above the charge but at the same time the heat generating arcs should be as close to the charge as possible without making actual contact with it. Both conditions are fulfilled, if use is made of the arrangement as described above. If two phase current is available the vertical electrode may be connected to the common middle point of the phases and two horizontal electrodes to the other ends of the phases. It is clear that the position of the first named electrode may be horizontal as well as vertical without changing the scope of the invention.

The accompanying drawing indicates how a system of electrodes may be arranged as set forth above.

Two electrodes indicated by the numeral 1 are located in or nearly in a plane opposing each other and another electrode 2 is located at right angle to the first named electrodes and substantially symmetrically between the ends of the electrodes. By connecting such a system of electrodes in a suitable manner to a source of electric power arcs 3 will be established as indicated by the drawing bending strongly away from the ends of the electrodes.

Having now fully described my invention I claim and desire to secure by Letters Patent of the United States of America:

1. The method of generating heat by means of electric arcs consisting in passing electric currents along and between a plurality of at least three electrodes so as to produce an electric arc, strongly deviating away from all the electrodes toward one side, one of the electrodes being located at right angle to a plane containing the other electrodes.

2. The method of generating heat by means of electric arcs consisting in passing two phase currents along and between two opposing electrodes to the end of a third electrode at right angle to and symmetrically located between the first named electrodes so as to cause an electric arc to burn between the ends of all the electrodes, strongly deviating away from the ends of the electrodes in the direction indicated by the symmetrically located electrode.

IVAR RENNERFELT.

Witnesses:
 BRUNO FLEISHBAUMERY,
 GRETA PINN.